(12) United States Patent
Keating

(10) Patent No.: US 7,600,944 B1
(45) Date of Patent: Oct. 13, 2009

(54) FLOOD VENT

(76) Inventor: John J. Keating, 297 Route 72 West, Manahawkin, NJ (US) 08050

( * ) Notice: Subject to any disclaimer, the term of this patent is extended or adjusted under 35 U.S.C. 154(b) by 0 days.

(21) Appl. No.: 11/982,003

(22) Filed: Oct. 31, 2007

(51) Int. Cl.
*E02B 7/50* (2006.01)
*E04B 1/70* (2006.01)

(52) U.S. Cl. ............... 405/96; 405/92; 405/101; 52/169.5; 52/302.1

(58) Field of Classification Search ........... 405/99–101; 52/169.5, 302.1, 302.3
See application file for complete search history.

(56) References Cited

U.S. PATENT DOCUMENTS

| | | | | | |
|---|---|---|---|---|---|
| 523,606 | A | * | 7/1894 | Milligan et al. | 405/95 |
| 2,105,735 | A | * | 1/1938 | Hodge | 49/193 |
| 2,774,116 | A | * | 12/1956 | Wolverton | 49/21 |
| 3,668,714 | A | * | 6/1972 | Baker | 4/510 |
| 3,939,505 | A | * | 2/1976 | Gross | 4/512 |
| 4,112,526 | A | * | 9/1978 | Patterson | 4/509 |
| 4,494,257 | A | * | 1/1985 | Peirish | 4/508 |
| 4,754,696 | A | * | 7/1988 | Sarazen et al. | 454/256 |
| 5,293,920 | A | * | 3/1994 | Vagedes | 160/89 |
| 5,487,701 | A | * | 1/1996 | Schedegger et al. | 454/271 |
| 5,729,935 | A | * | 3/1998 | Schiedegger et al. | 52/198 |
| 5,944,445 | A | * | 8/1999 | Montgomery | 405/92 |
| 6,485,231 | B2 | * | 11/2002 | Montgomery et al. | 405/92 |
| 6,692,187 | B2 | * | 2/2004 | Sprengle et al. | 405/92 |
| 7,270,498 | B1 | * | 9/2007 | Albanese | 405/104 |
| 2002/0021941 | A1 | * | 2/2002 | Montgomery et al. | 405/100 |
| 2003/0082008 | A1 | * | 5/2003 | Sprengle et al. | 405/87 |

* cited by examiner

*Primary Examiner*—Tara Mayo-Pinnock
(74) *Attorney, Agent, or Firm*—Michael R. Philips

(57) ABSTRACT

The flood vent of the invention provides a frame configured for installation in a concrete block foundation wall in place of a single block. The frame includes an angularly oriented window. A gate is pivotally mounted at an upper end thereof within the frame to rest against the window, causing the gate to reside at an angle and be held closed by gravity. A float is mounted to the gate and positioned at rest below the lower edge of the frame to cause the gate to pivot toward an open position when flood water rises to a level approaching the wall opening.

5 Claims, 4 Drawing Sheets

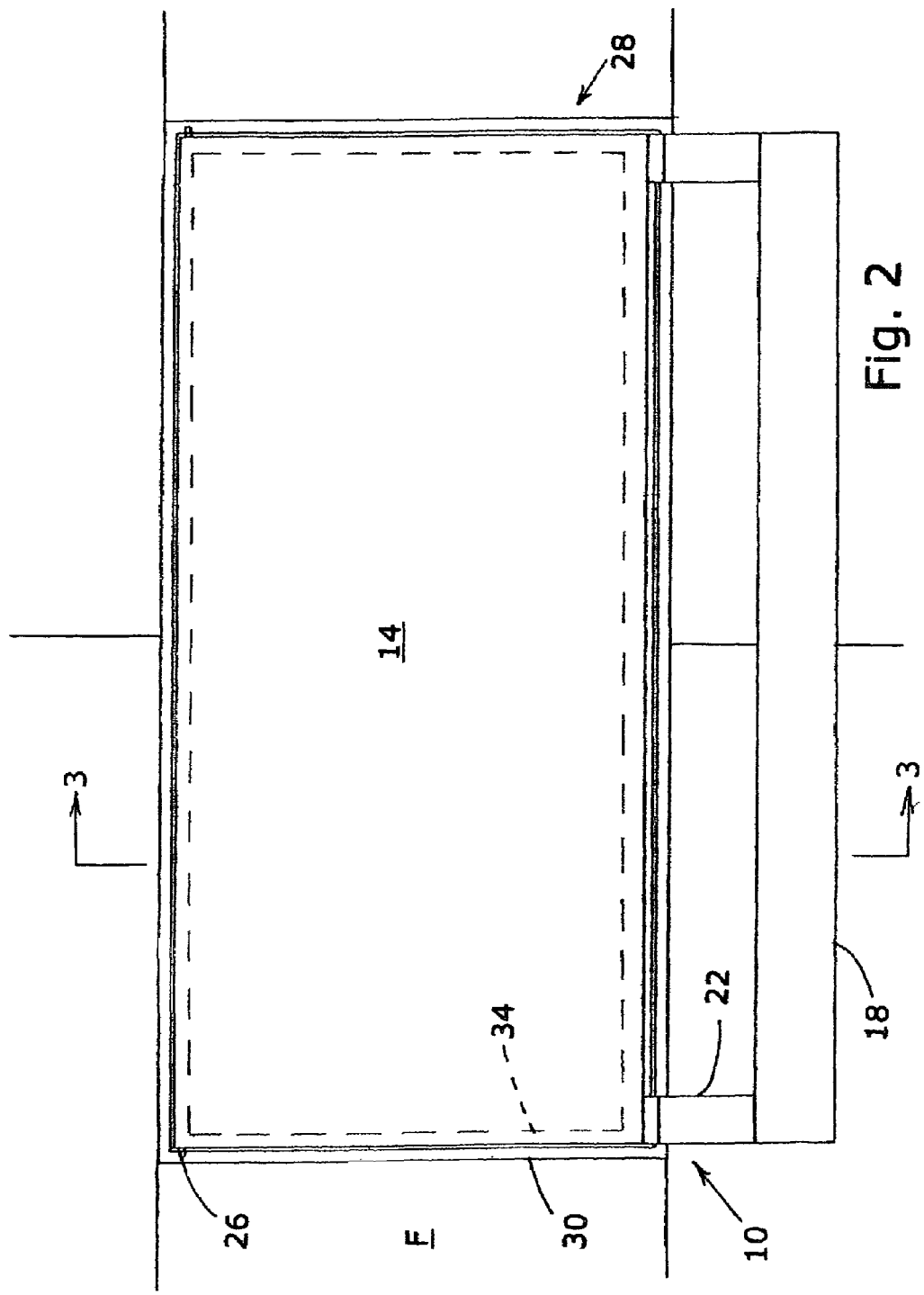

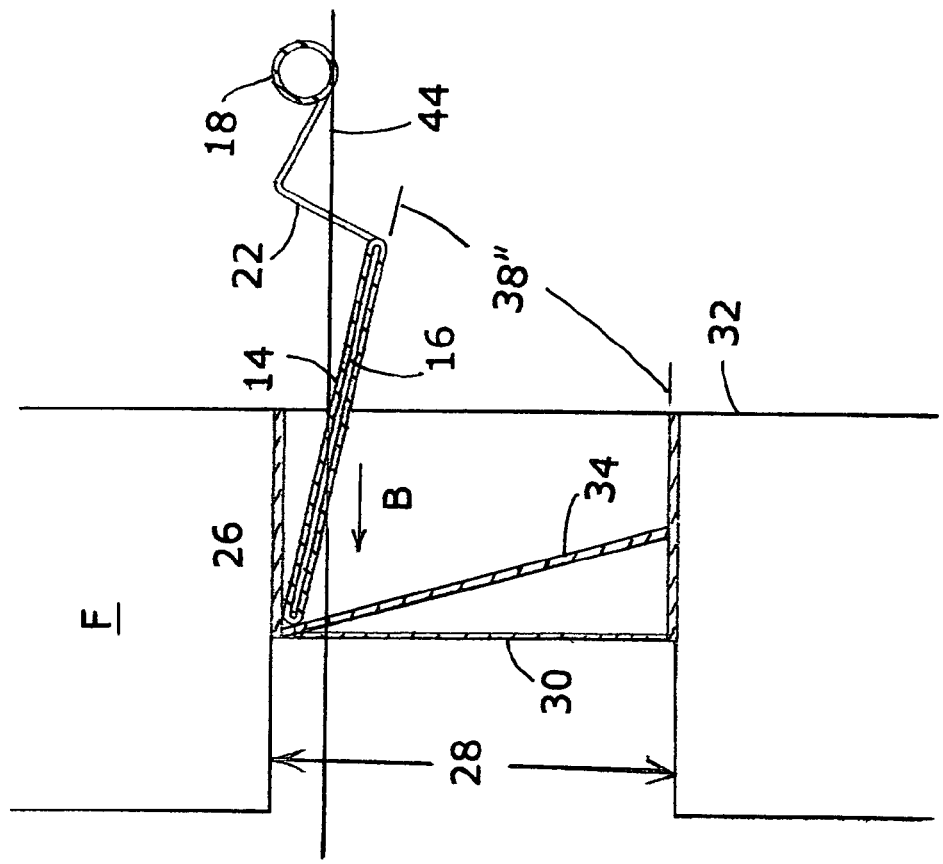
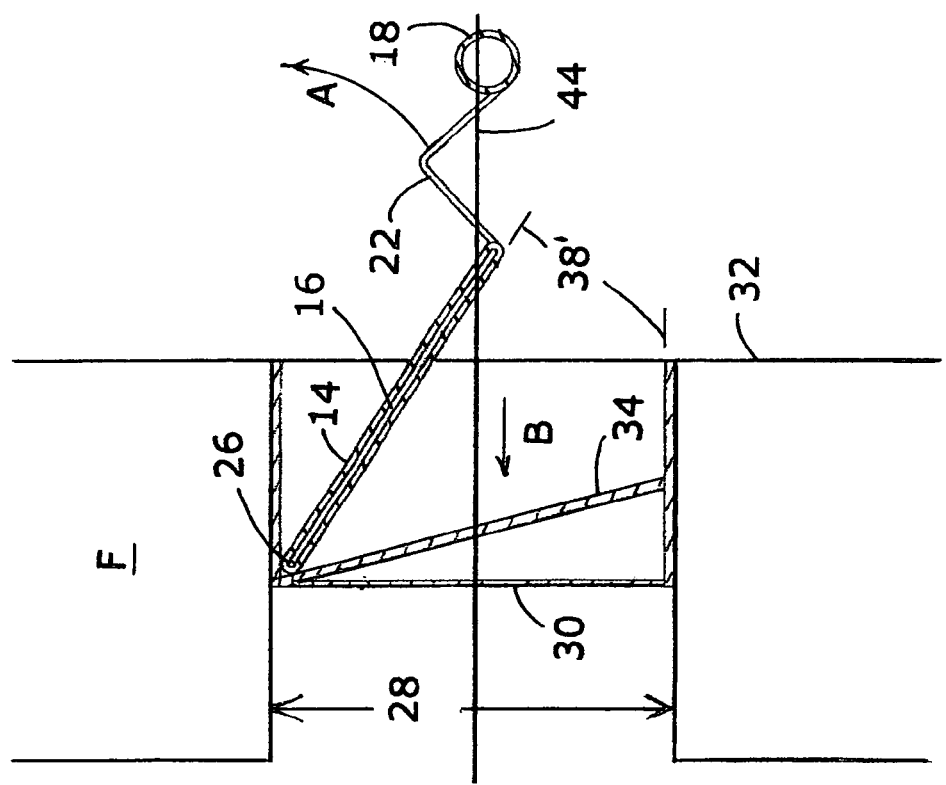

FLOOD VENT

FIELD OF THE INVENTION

The present invention relates to the field of building construction components, and more particularly to construction components that are incorporated in a foundation wall and will automatically open to relieve the pressure of rising flood water.

BACKGROUND OF THE INVENTION

When a building foundation constructed by traditional methods is subjected to a flood, serious building damage can occur. Water is capable of doing permanent structural damage to a building, especially when the water contact occurs during a storm that will increase the force against the foundation walls. To alleviate this damage potential, many modern building codes have incorporated rules mandating the use of flood water pressure relief panels in foundation walls. Pressure relief panels are typically of one or two possible types, an open grate panel or a breakaway panel. The open grate panel is substantially a screen that will allow water to pass through, while preventing small animals from entering the basement or crawlspace. The breakaway panel is not porous and is weaker than the rest of the foundation wall in order to collapse when water pressure increases against the panel. In either case, when flood water presses against the building foundation, the water is intended to flow through a wall opening rather than cause structural damage to the foundation. A drawback of the open grate panel is that wind will pass through and, during colder weather, cause the building above to be cooler than desired. The building owner will often block the open grate with wood or other nonporous material to prevent the wind from entering, thereby also preventing water from passing through and defeating the value of the panel. A drawback of the breakaway panel is that once water has forced the panel out of position, a new panel must be purchased and installed.

SUMMARY OF THE INVENTION

The present invention overcomes the drawbacks of the known flood damage prevention panels by providing a pivotally mounted gate installable through a foundation wall. A float is affixed to the gate to reside adjacent to the external surface of the foundation wall when the gate is at rest. The gate is mounted in a frame having an angularly oriented window to substantially seal around the gate and to prevent wind or animals from entering the building, while allowing the gate to automatically open when flood water rises to a critical level lifting the float.

BRIEF DESCRIPTION OF THE DRAWINGS

The present invention is best understood in conjunction with the accompanying drawing figures in which like elements are identified by similar reference numerals and wherein:

FIG. 2 is an enlarged partial front elevation view of the flood vent installed in a foundation.

FIG. 5 shows the view of FIG. 4 with the flood vent half opened by rising flood water.

FIG. 6 shows the view of FIG. 5 with the flood vent substantially fully opened by rising flood water.

DETAILED DESCRIPTION OF THE PREFERRED EMBODIMENTS

Figure 1:
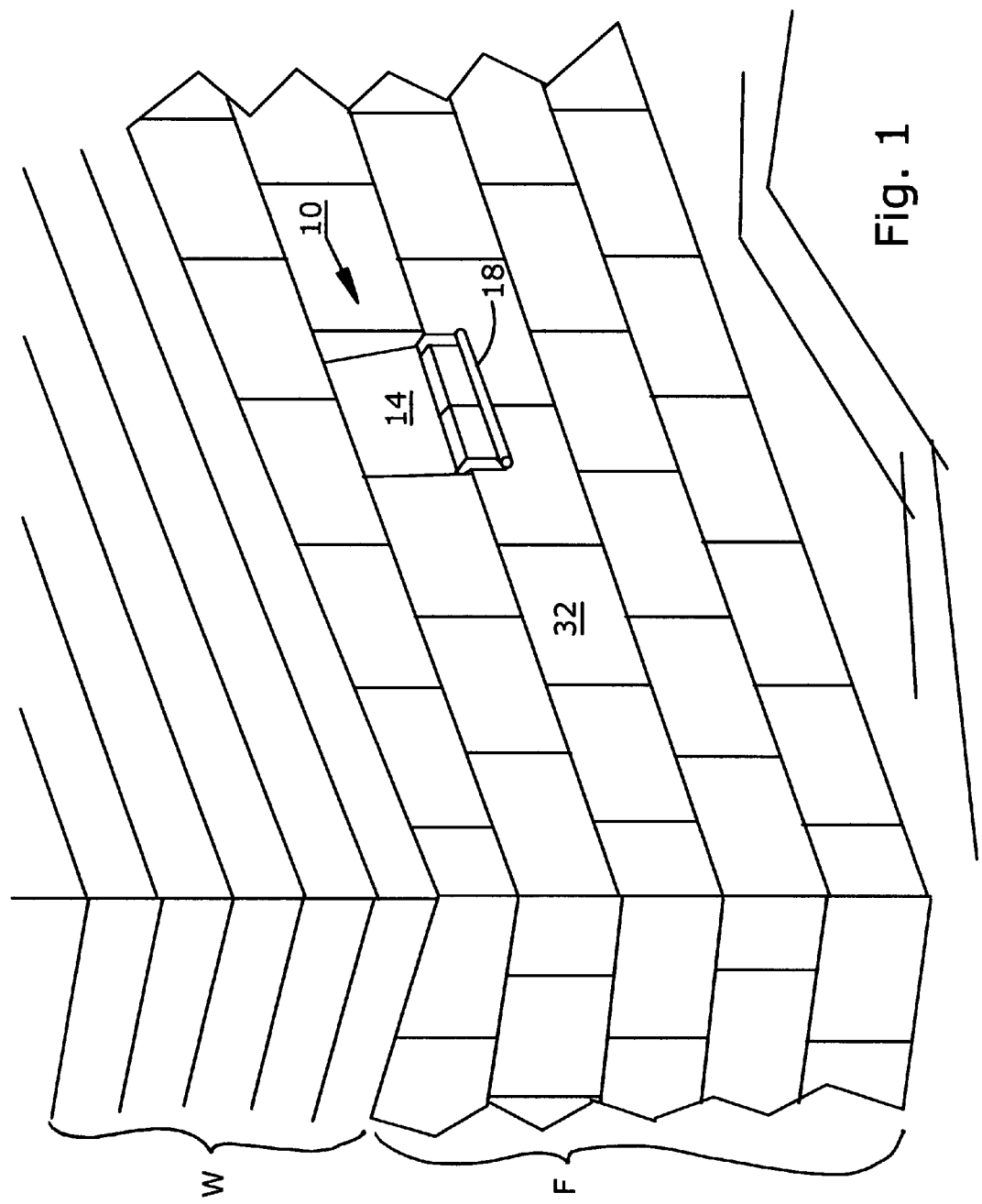
FIG. 1 is a partial perspective view of the exterior of a building with the flood vent of the present invention installed through the foundation thereof.

Referring now to FIG. 1, a perspective view of a corner section of a building, for example a single family home, is shown. The lower portion of the building comprises foundation F formed of concrete blocks, as is common. Foundation F may be finished with an overcoating of concrete to mask the joints between adjacent concrete blocks or left natural as illustrated. The upper portion of the building comprises wall W formed with an exterior siding of lapped boards or vinyl paneling. At least one concrete block is omitted from the wall of foundation F and a flood vent 10 of the present invention is installed in the opening. Flood vent 10 has a planar gate 14 that resides at an angle to the outer surface 32 of foundation F and a float 18 that depends from gate 14 to be located adjacent to the outer surface 32. Whereas a single flood vent 10 is shown, a greater number of such flood vents 10 may be installed according to the building requirements, particularly in additional walls of foundation F.

Referring now to FIG. 2, flood vent 10 is shown in front elevation view as it is installed in the opening of foundation F. A frame 30 is sized and shaped to fit snugly in an opening 28 in foundation F. In a foundation typically built of concrete blocks, opening 28 is approximately 8 inches high by 16 inches wide. Frame 30 may be affixed in opening 28 in foundation F by the use of metal fasteners or an adhesive. Gate 14 is pivotally suspended in frame 30 by a pair of pivot pins 26 positioned at each upper corner of frame 30. Gate 14 is formed with holes that are sized and positioned at the upper corners thereof to receive pivot pins 26. Pivot pins 26 may be formed integrally with frame 30 or may be separate parts that are assembled thereto. Alternatively, pins 26 may be affixed to gate 14 for insertion in matching holes in frame 30. A window 34 is formed in frame 30 as an array of top, left side, right side and bottom planar members extending inwardly of frame 30 in a position behind gate 14. Window 34 is sized to support gate 14 in the rest condition when no flood water is present. A pair of brackets 22 extend down from the lower end of gate 14 to support float 18. It is preferred that flood vent 10 is fully assembled as a unit before being installed in a foundation F, although installation by parts is deemed to be within the scope of the invention disclosed.

Figure 3:
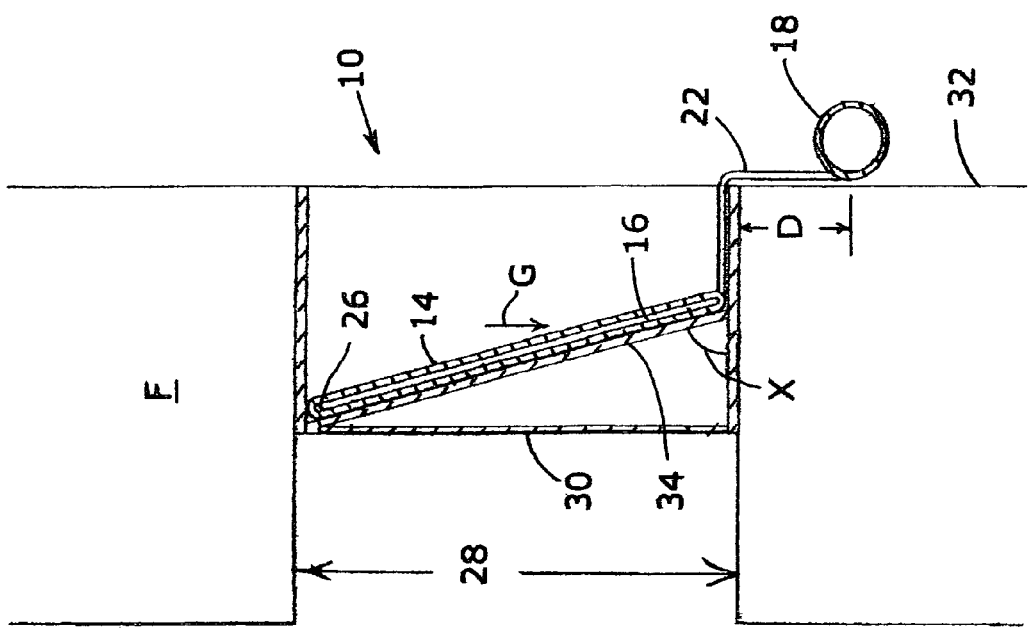
FIG. 3 is a cross sectional view of the flood vent taken in the direction indicated by line 3-3 of FIG. 2 with the flood vent residing in a rest condition.

Referring now to FIG. 3, flood vent 10 is shown in side elevation cross sectional view as installed in opening 28 of foundation F, and as residing in rest condition, i.e. with no rising flood water involved. As illustrated, frame 30 is in the form of a hollow box with a top side, a rear panel and a bottom side. Gate 14, according to the preferred embodiment of the invention, is formed as a hollow, sealed two-panel structure having an air space 16 entrapped therein. It is, however, contemplated that a single planar panel provides the basic features of the invention disclosed. Window 34 is oriented at an angle X to horizontal. The length of gate 14 is such as to cause gate 14 to rest at angle X in contact with window 34. The angular orientation of gate 14 allows the downward force G of gravity on gate 14 to substantially create a seal between gate 14 and window 34, preventing wind from passing into the building while permitting gate 14 to swing outward on pivot pins 26. Bracket 22 extends outward from the lower end of gate 14 and bends downward at the outer edge of frame 30 to support float 18 a distance D below the lower extremity of opening 28. In this way, when flood water rises adjacent to foundation wall F, float 18 is lifted, causing gate 14 to open before water contacts the surface of gate 14, preparing an open flow path for the flood water. Float 18 is preferably an elongate hollow tube with sealed ends affixed to the lower end of each bracket 22. Alternate forms of floatation component, e.g. a foam polymer geometric shape, are considered within the scope of the present invention. Frame 30, gate 14 and associated components of the present invention are preferably formed of plastic resins, e.g. polypropylene or polyethylene, being substantially unaffected by exposure to weather and having a specific gravity less than water. In the preferred embodiment of the invention, the components are formed of high density polyethylene.

Figure 4:
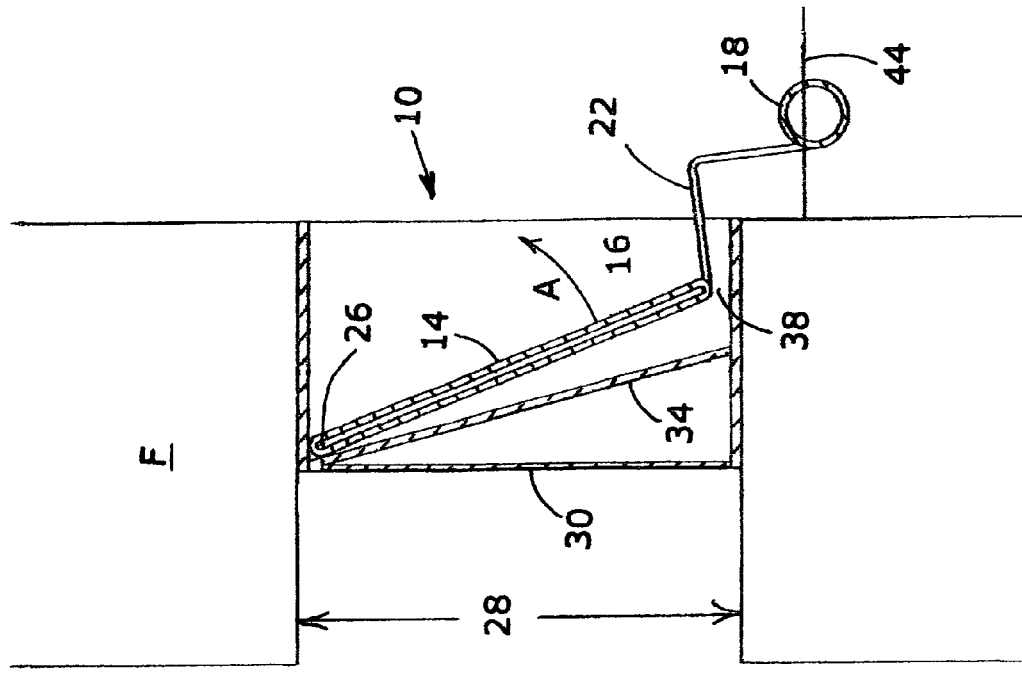
FIG. 4 shows the view of FIG. 3 with the flood vent partially opened by rising flood water.

Referring now to FIG. 4, flood vent 10 is shown as flood water 44 rises to a level sufficient to begin to lift float 18. Float 18 in turn raises brackets 22 in the direction indicated by arrow A to cause gate 14 to swing away from window 34 about pivot pins 26. In this situation, gate 14 has moved away from supporting window 34 to form a gap 38 therebetween. Flood water 44 has not begun to enter opening 28 in foundation F. It is to be noted that the position of float 18 at distance D (see FIG. 3) below the bottom of frame 30 allows rising flood water 44 to lift float 18 and swing gate 14 partly open before flood water 44 reaches the height of opening 28. Without such a novel float arrangement, flood water 44 would not affect gate 14 until flood water 44 entered opening 28, possibly causing flood water 44 to press gate 14 against window 34, substantially defeating the benefit of a pivotable flood vent device.

Referring now to FIG. 5, the level of flood water 44 has increased over the level shown in FIG. 4. Float 18 and gate 14 continue to open in the direction of arrow A. Float 18 is in a position where gate 14 is approximately halfway open and gap 38' is greater than gap 38 of FIG. 4. Flood water 44 is higher than the lower edge of opening 28 and has begun to flow through foundation F in the direction indicated by arrow B. By allowing flood water 44 to flow through opening 28, the force against foundation F and the potential damage to the building are significantly reduced.

Referring now to FIG. 6, flood water 44 has risen almost to the upper edge of opening 28. Gate 14 is approaching a horizontal orientation and gap 38", larger than gap 38' of FIG. 5, allows a substantially full flow of flood water 44 in the direction of arrow B.

At a later point in time when the flood water subsides or is removed from the interior of the building, float 18 and gate 14 will automatically return to the position shown in FIG. 3, to substantially prevent cold air, animals and insects from entering the building. The description above relates to a single flood vent sized to fit an opening of one concrete block. It is to be understood that a greater number of flood vents and/or a flood vents of different sizes are expressly believed to be within the scope of the invention disclosed.

It is considered typical construction method to install the flood vent of the invention in multiple foundation walls of a building. In most cases, all four foundation walls will be fitted with such a flood vent, although flood vents in two opposed foundation walls will satisfy the major objectives of the invention. As such, when flood water first approaches the building, e.g. from the uphill side, only a single building wall is affected. The flood water will open the flood vent as described above and gradually fill the building space within the foundation. It is considered a further benefit of the present invention that when the flood water rises within the foundation to a level of the flood vents, a vent opposite to the building wall through which the flood water initially entered the building is readily opened by the rising water pushing out on the flood gate. This is particularly helpful when the building is located on a slope and the flood water approaches from the higher side, allowing the flood water to be discharged from the lower side.

While the description above discloses preferred embodiments of the present invention, it is contemplated that numerous variations and modifications of the invention are possible and are considered to be within the scope of the claims that follow.

What is claimed is:

1. A flood vent, comprising:
   a. a frame for being fixedly installed in an opening in a building foundation wall;
   b. a gate having an upper end and a lower end and being pivotally mounted to the frame at the upper end;
   c. a window formed of top, bottom, left and right side planar members affixed to and extending inwardly of the frame at an acute angle to horizontal such that the gate in rest condition resides in contact with the window in substantially sealing relationship thereto; and
   d. a float connected to the lower end of the gate, the float residing outside of the frame;
   e. whereas when flood water rises adjacent to the building foundation wall to lift the float, the float causes the gate to pivot upwardly away from the window to provide an opening for water to pass through.

2. The flood vent described in claim 1, wherein the float is connected to the gate such that with the gate in rest condition the float is lower than the lower end of the gate.

3. The flood vent described in claim 1, wherein the float comprises an elongate sealed tube.

4. The flood vent described in claim 1, wherein the gate is mounted in a manner to pivot arcuately around the upper end thereof as the float is raised by water.

5. The flood vent described in claim 1, wherein the gate comprises a pair of planar members sealed to one another to form an air space.

\* \* \* \* \*